(12) United States Patent
Whitlock et al.

(10) Patent No.: US 11,525,393 B2
(45) Date of Patent: Dec. 13, 2022

(54) TURBINE ENGINE WITH CENTRIFUGAL COMPRESSOR HAVING IMPELLER BACKPLATE OFFTAKE

(71) Applicant: Rolls-Royce Corporation, Indianapolis, IN (US)

(72) Inventors: Mark E. Whitlock, Zionsville, IN (US); Nathanael Cooper, Avon, IN (US); Steven Mazur, Indianapolis, IN (US); Michael Nesteroff, Indianapolis, IN (US); Paul Melevage, Crawfordsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 241 days.

(21) Appl. No.: 16/824,171

(22) Filed: Mar. 19, 2020

(65) Prior Publication Data

US 2021/0293180 A1   Sep. 23, 2021

(51) Int. Cl.

| | |
|---|---|
| *F02C 3/08* | (2006.01) |
| *F02C 6/08* | (2006.01) |
| *F02C 7/28* | (2006.01) |
| *F01D 5/04* | (2006.01) |
| *F01D 5/08* | (2006.01) |

(52) U.S. Cl.
CPC .................. *F02C 3/08* (2013.01); *F02C 6/08* (2013.01); *F02C 7/28* (2013.01); *F01D 5/046* (2013.01); *F01D 5/081* (2013.01); *F05D 2220/3219* (2013.01)

(58) Field of Classification Search
CPC .......... F01D 5/081; F01D 5/082; F01D 5/084; F01D 5/3015; F01D 25/12; F02C 7/18; F02C 7/185; F02C 3/08; F02C 3/20; F02C 3/103; F02C 3/085; F02C 3/09; F02C 6/08; F05D 2260/221; F05D 2260/2214; F05D 2260/22141; F05D 2260/231; F05D 2220/3219; F05D 2240/15

See application file for complete search history.

(56) References Cited

U.S. PATENT DOCUMENTS

| | | |
|---|---|---|
| 2,777,395 A | 1/1957 | Disbrow |
| 4,256,436 A | 3/1981 | Fandrey et al. |
| 4,459,802 A | 7/1984 | Mowill |
| 4,462,204 A | 7/1984 | Hull |
| 4,709,546 A * | 12/1987 | Weiler ...................... F02C 7/18 60/795 |
| 4,761,947 A * | 8/1988 | Hennecke ................. F02C 7/12 415/176 |
| 4,786,238 A | 11/1988 | Glaser et al. |
| 5,147,178 A | 9/1992 | Treece |
| 5,224,822 A | 7/1993 | Lenahan et al. |
| 5,385,442 A | 1/1995 | Lehe et al. |

(Continued)

*Primary Examiner* — Stephanie Sebasco Cheng
(74) *Attorney, Agent, or Firm* — Barnes & Thornburg LLP

(57) ABSTRACT

A gas turbine engine includes a fan, a compressor, a combustor, and a turbine. The compressor compresses gases entering the gas turbine engine. The combustor receives the compressed gases from the compressor and mixes fuel with the compressed gases. The turbine receives the hot, high pressure combustion products created by the combustor by igniting the fuel mixed with the compressed gases. The turbine extracts mechanical work from the hot, high pressure combustion products to drive the fan and compressor.

30 Claims, 5 Drawing Sheets

(56) References Cited

U.S. PATENT DOCUMENTS

| | | |
|---|---|---|
| 5,555,721 A | 9/1996 | Bourneuf et al. |
| 5,996,331 A | 12/1999 | Palmer |
| 6,035,627 A | 3/2000 | Liu |
| 6,190,123 B1 | 2/2001 | Wunderwald et al. |
| 6,227,801 B1 | 5/2001 | Liu |
| 6,234,746 B1 | 5/2001 | Schroder et al. |
| 6,238,179 B1 | 5/2001 | Wunderwald et al. |
| 6,257,834 B1 | 7/2001 | Bremer et al. |
| 6,276,896 B1 | 8/2001 | Burge et al. |
| 6,513,335 B2 | 2/2003 | Fukutani |
| 6,585,482 B1 | 7/2003 | Liotta et al. |
| 6,966,191 B2 | 11/2005 | Fukutani et al. |
| 7,287,384 B2 | 10/2007 | Fish et al. |
| 7,682,131 B2 | 3/2010 | Legare et al. |
| 7,775,758 B2 | 8/2010 | Legare |
| 7,827,798 B2 | 11/2010 | Commaret et al. |
| 7,841,187 B2 * | 11/2010 | Behaghel ............ F01D 5/046 60/785 |
| 7,942,630 B2 | 5/2011 | Argaud et al. |
| 8,029,238 B2 | 10/2011 | Argaud et al. |
| 8,075,247 B2 | 12/2011 | Romani et al. |
| 8,087,249 B2 | 1/2012 | Ottaviano et al. |
| 8,147,178 B2 * | 4/2012 | Ottaviano ............ F02C 3/08 415/104 |
| 8,177,475 B2 | 5/2012 | Joco et al. |
| 8,226,353 B2 | 7/2012 | Argaud et al. |
| 8,336,317 B2 | 12/2012 | Blanchard et al. |
| 8,402,770 B2 | 3/2013 | Garin et al. |
| 8,529,195 B2 | 9/2013 | Widener |
| 8,800,291 B2 | 8/2014 | Bil et al. |
| 9,003,793 B2 | 4/2015 | Begin et al. |
| 9,228,497 B2 | 1/2016 | Ottow et al. |
| 9,650,916 B2 | 5/2017 | Barton et al. |
| 9,683,488 B2 | 6/2017 | Ress, Jr. et al. |
| 10,359,051 B2 | 7/2019 | Gage et al. |
| 10,415,391 B2 | 9/2019 | Duong et al. |
| 10,830,144 B2 * | 11/2020 | Lambert ............... F02C 3/08 |
| 2018/0066579 A1 | 3/2018 | Lambert et al. |
| 2018/0066585 A1 | 3/2018 | Lambert et al. |
| 2018/0291928 A1 | 10/2018 | Kenworthy et al. |
| 2019/0063324 A1 * | 2/2019 | Gould .................. F02C 7/18 |

* cited by examiner

TURBINE ENGINE WITH CENTRIFUGAL COMPRESSOR HAVING IMPELLER BACKPLATE OFFTAKE

FIELD OF THE DISCLOSURE

The present disclosure relates generally to gas turbine engines and more specifically to gas turbine engines with centrifugal compression.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Some gas turbine engines include compressors with one or more stages of axial and/or centrifugal compression. Cooling or avoiding heat generation in compressors may improve component lifetime and performance. Some compressors may be cooled using bleed air that is subsequently discarded, sacrificing both the temperature and pressure of that cooling air.

SUMMARY

The present disclosure may comprise one or more of the following features and combinations thereof.

A turbine engine may include a centrifugal compressor, a combustor, a turbine, and a manifold. The combustor may be fluidly coupled to the centrifugal compressor to receive the majority of compressed gases discharged from the compressor. The turbine may be fluidly coupled to the combustor to receive the hot, high pressure combustion products from the combustor. The turbine may be configured to extract mechanical work from the hot, high pressure combustion products. The manifold may be mounted to the compressor and shaped to define a number of circumferentially spaced apart channels.

In some embodiments, the centrifugal compressor may include an impeller and an impeller backing plate. The impeller may be mounted for rotation about an axis and formed to have impeller blades and an impeller disk. The impeller blades may extend from a forward side of the impeller disk. The impeller backing plate may be arranged along an aft side of the impeller disk to define a back cavity of the centrifugal compressor therebetween.

In some embodiments, the impeller backing plate may be formed to include a number of bleed holes. The bleed holes may be arranged radially inwardly from an outlet tip of the impeller blades so as to allow for compressed gases discharged from the outlet tip of the impeller blades to move over the outlet tip and radially along a portion of the impeller disk on the aft side of the impeller disk before moving through the impeller backing plate, In some embodiments, the combustor may receive the majority of compressed gases discharged from the outlet tip of the impeller blades as compressor discharge air. The combustor may be configured to mix fuel with the compressor discharge air and ignite the fuel so as to create hot, high pressure combustion products.

In some embodiments, the turbine includes a rotor, at least one set of turbine blades, and a seal. The rotor may have a shaft mounted for rotation about the axis. The set of turbine blades may be coupled to the shaft for rotation therewith. The seal may be formed from forward and aft sealing elements. The forward and aft sealing elements may engage the impeller backing plate of the centrifugal compressor to fluidly separate the back cavity of the compressor from the turbine.

In some embodiments, the forward and aft sealing elements of the seal may form a seal cavity there between. The seal cavity may be in fluid communication with the combustor to receive compressor discharge air from the combustor. In some embodiments, the seal cavity may be pressurized by the compressor discharge air.

In some embodiments, the manifold may be mounted to the impeller backing plate to form the number of circumferentially spaced apart channels. The number of circumferentially spaced apart channels that receive compressed gases moving through the number of bleed holes may carry the compressed gases from the centrifugal compressor to the turbine bypassing the combustor.

In some embodiments, the forward sealing element of the seal included in the turbine may be configured to leak compressor discharge air to the back cavity formed between the impeller disk of the compressor and the impeller backing plate. The aft sealing element of the seal included in the turbine may be configured to leak compressor discharge air to turbine. In some embodiments, the forward and aft sealing elements may be positioned at the same radial location relative to the shaft of the turbine.

In some embodiments, the impeller backing plate may be formed to include a plurality of impingement holes. The impingement holes may extend radially through the impeller backing plate and open into the seal cavity to transmit compressor discharge air from the compressor to the seal cavity. In some embodiments, the plurality of impingement holes may be circumferentially located between the number of circumferentially spaced apart channels formed by the manifold.

In some embodiments, at least one bleed hole of the number of bleed holes may be configured to provide compressed gases to at least one channel of the number of circumferentially spaced apart channels formed by the manifold. In some embodiments, at least two bleeds holes may be configured to provide compressed gases to at least one channel of the number of circumferentially spaced apart channels formed by the manifold.

In some embodiments, the number of bleed holes may be positioned at a preselected radial location relative to the axis. The preselected radial location of the bleed holes may be positioned so as to bleed an amount of compressed gases from the outlet tip of the impeller blades that decreases windage at or near the outlet tip of the impeller blades.

According to another aspect of the present disclosure, the gas turbine engine may include a centrifugal compressor, a turbine, and a manifold. The centrifugal compressor may include an impeller mounted for rotation about an axis and an impeller backing plate. The impeller may have impeller blades that extend from a forward side of an impeller disk. The impeller backing plate may be arranged along an aft side of the impeller disk to define a back cavity of the centrifugal compressor therebetween.

In some embodiments, the impeller backing plate may be formed to include a number of bleed holes. The number of bleed holes may be arranged radially inwardly from an outlet tip of the impeller blades.

In some embodiments, the turbine may include a rotor and a seal. The rotor may have a shaft mounted for rotation about the axis and a seal. The seal may be formed from forward and aft sealing elements that engage the impeller backing plate of the centrifugal compressor to fluidly separate the back cavity of the compressor from the turbine.

In some embodiments, the manifold may be mounted to the impeller backing plate. The manifold may be shaped to define a number of circumferentially spaced apart channels. The channels may receive compressed bleed gases moving through the number of bleed holes and carry the compressed bleed gases from the centrifugal compressor to the turbine bypassing other components of the gas turbine engine.

In some embodiments, the gas turbine engine may further include a combustor. The combustor may be fluidly coupled to the centrifugal compressor to receive the majority of compressed gases from the centrifugal compressor. The combustor may also be fluidly coupled to the turbine to discharge hot, high pressure combustion products to the turbine.

In some embodiments, the seal cavity may be pressurized. The seal cavity may be pressurized by the compressor discharge air.

In some embodiments, the forward sealing element of the seal may be configured to leak compressor discharge air to the back cavity formed between the impeller disk of the compressor and the impeller backing plate. The aft sealing element of the seal included in the turbine may be configured to leak compressor discharge air to the seal cavity. In some embodiments, the forward and aft sealing elements may be positioned at the same radial location relative to the shaft of the turbine.

In some embodiments, the impeller backing plate may be formed to include a plurality of impingement holes. The plurality of impingement holes may extend radially through the impeller backing plate and open into the seal cavity to transmit compressed gases moving through the number of circumferentially spaced apart channels. In some embodiments, the plurality of impingement holes may be circumferentially spaced apart between the number of circumferentially spaced apart channels formed by the manifold.

In some embodiments, at least one bleed hole of the number of bleed holes may be configured to provide compressed gases to at least one channel of the number of circumferentially spaced apart channels formed by the manifold. In some embodiments, at least two bleeds holes may be configured to provide compressed gases to at least one channel of the number of circumferentially spaced apart channels formed by the manifold.

These and other features of the present disclosure will become more apparent from the following description of the illustrative embodiments.

DETAILED DESCRIPTION OF THE DRAWINGS

Figure 1:
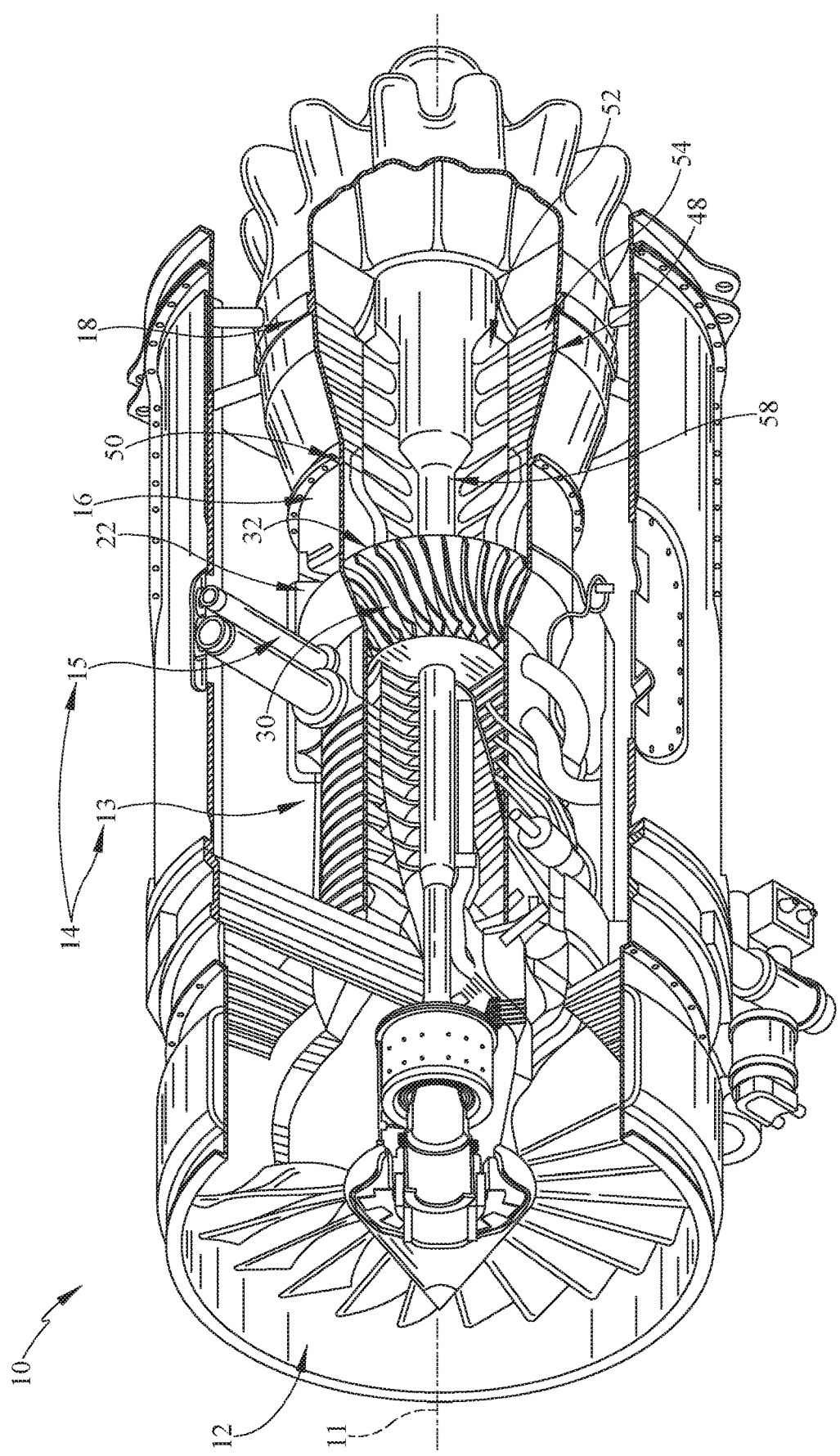
FIG. 1 is a cut away perspective view of a gas turbine engine showing the engine includes a fan, an axi-centrifugal compressor, a combustor fluidly coupled to the compressor, and a turbine fluidly coupled to the combustor.

For the purposes of promoting an understanding of the principles of the disclosure, reference will now be made to a number of illustrative embodiments illustrated in the drawings and specific language will be used to describe the same.

An illustrative gas turbine engine 10 includes a fan 12, an axi-centrifugal compressor 14, a combustor 16 fluidly coupled to the compressor 14, and a turbine 18 fluidly coupled to the combustor 16 as shown in FIGS. 1-4. The fan 12 is driven by the turbine 18 and provides thrust for propelling an aircraft. The compressor 14 compresses gases entering the engine 10 along a core flow path (represented by arrows 19). The compressor 14 delivers the compressed gases to the combustor 16. The combustor 16 mixes fuel with the compressed gases and ignites the fuel to produce hot, high pressure combustion products. The hot, high pressure combustion products of the combustion reaction in the combustor 16 are directed into the turbine 18 to cause the turbine 18 to rotate about an axis 11 of the gas turbine engine 10. The turbine 18 extracts mechanical work from the hot, high pressure combustion products to drive the compressor 14 and the fan 12.

Figure 2:
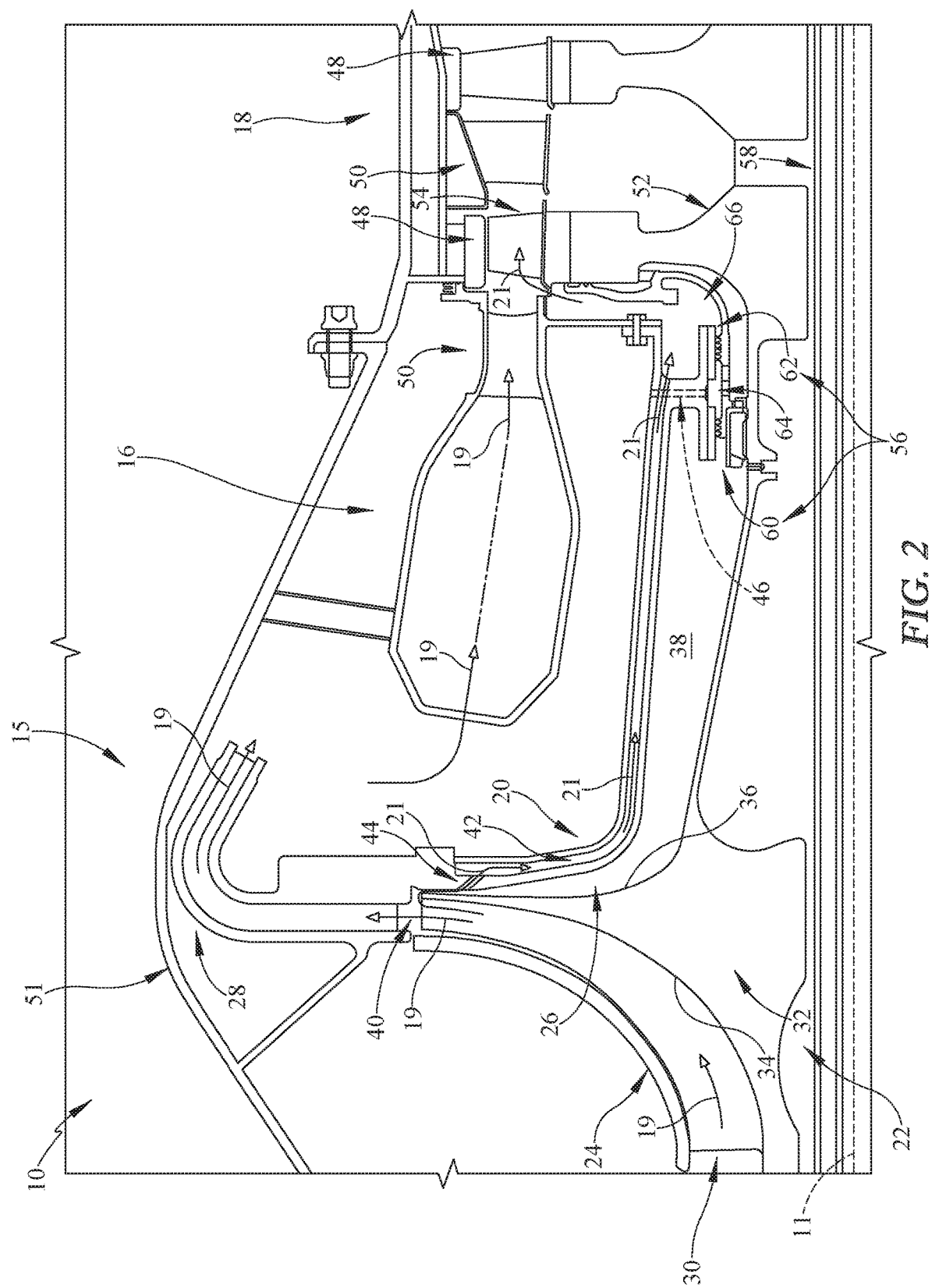
FIG. 2 is a cross section view of the gas turbine engine of FIG. 1 showing the axi-centrifugal compressor has a centrifugal compressor that includes (i) an impeller mounted for rotation about an axis having impeller blades that extend from a forward side of an impeller disk and (ii) an impeller backing plate arranged along an aft side of the impeller disk to define a back cavity of the centrifugal compressor, and further showing the gas turbine engine also includes a manifold coupled to the impeller backing plate that defines a number of channels that transmit a portion of the compressed gases from the centrifugal compressor stage of the compressor to the turbine bypassing the combustor.
Figure 3:
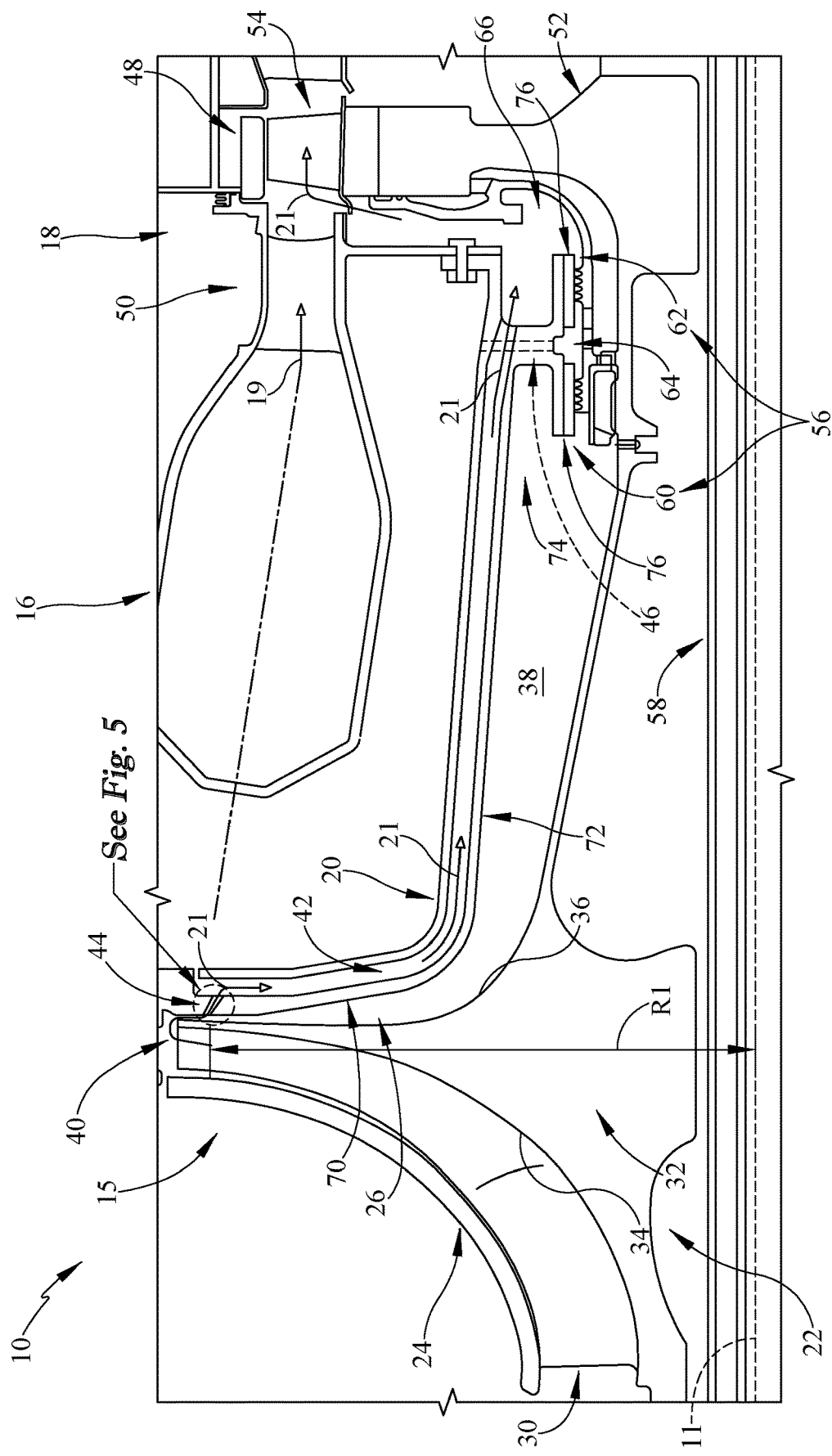
FIG. 3 is a detail view of FIG. 2 showing the impeller backing plate is formed to include a number of bleed holes that allow for compressor discharge air from an outlet tip of the impeller blades to move over the outlet tip and radially along a portion of the impeller disk before moving through the number of channels along the impeller backing plate.
Figure 4:
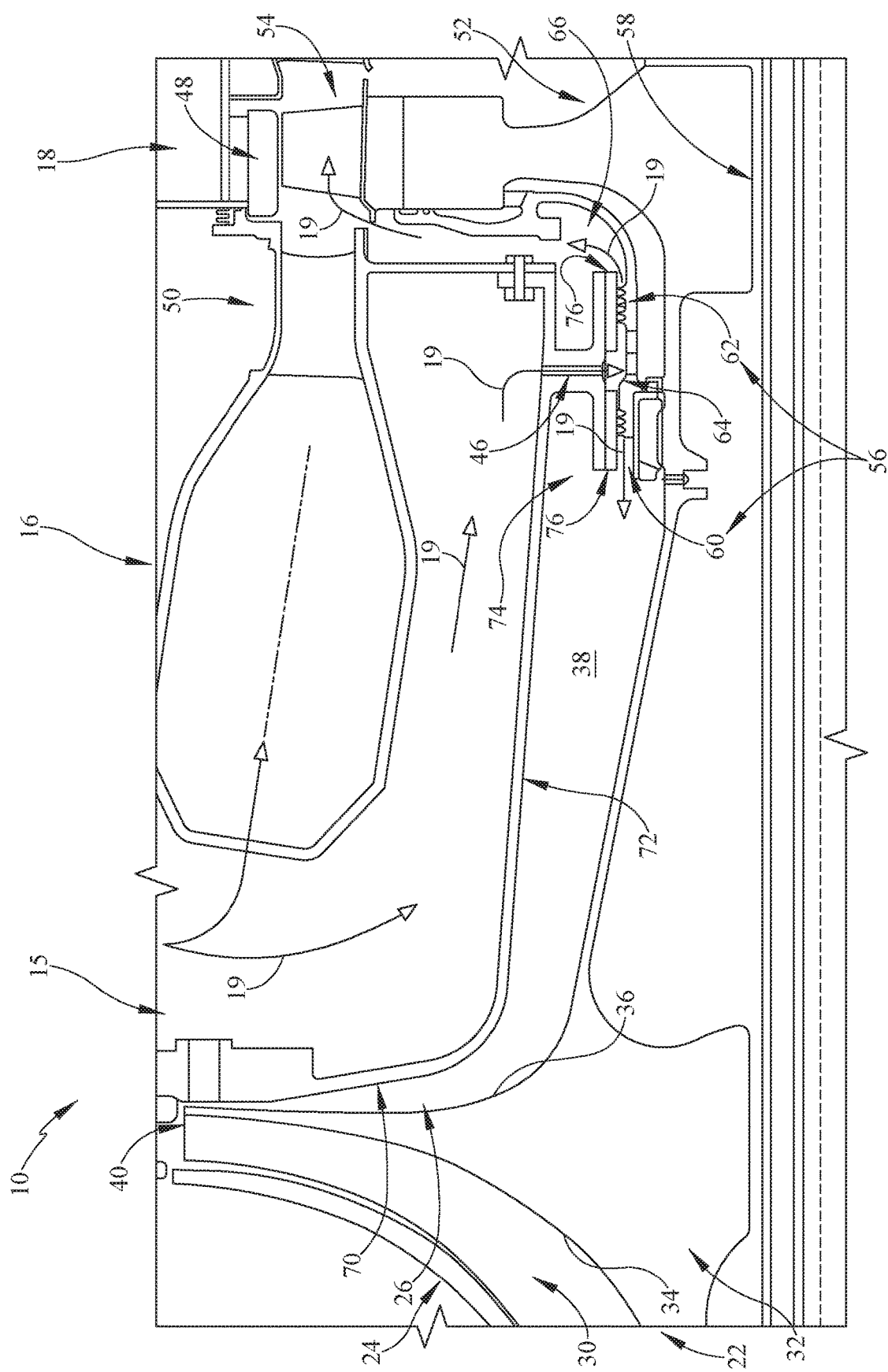
FIG. 4 is a cross section view of the gas turbine engine of FIGS. 1-3 at a different circumferential location showing the turbine includes (i) a rotor having a shaft mounted for rotation about the axis, (ii) at least one set of turbine blades coupled to the shaft for rotation therewith, and (iii) forward and aft sealing elements coupled to the rotor that engage the impeller backing plate to fluidly separate the back cavity of the compressor from the turbine, and further showing impeller backing plate further includes a number of impingement holes that open into a seal cavity defined by the forward and aft sealing elements to transmit compressed gases into the seal cavity.

The axi-centrifugal compressor 14 has axial compression stages 13 and a centrifugal compression stage 15 as shown in FIG. 1. The centrifugal compression stage 15 includes an impeller 22, an impeller shroud 24, and an impeller backing plate 26 as shown in FIGS. 2-4. The impeller 22 is mounted for rotation about the axis 11 and formed to have impeller blades 30. The impeller blades 30 each extend from a forward side 34 of an impeller disk 32. The impeller shroud 24 restricts gases from moving over the impeller blades 30 without interacting with the impeller blades 30. The impeller backing plate 26, or sometimes referred to herein as an inner combustor case, is arranged along an aft side 36 of the impeller disk 32 to define a back cavity 38 of the centrifugal compressor 15. In the illustrative embodiment, the compressor 15 further includes a diffuser 28 coupled to impeller 22 to receive the compressed gases from the impeller 22 and discharge the compressed gases to the combustor 16.

In some embodiments, compressor impellers can generate high temperatures in operation. High temperatures or heat generation by the compressor impeller may be a result of increased windage at or near the compressor impeller tip. Reducing or avoiding heat generation by compressor impellers in operation may improve impeller function, efficiency, and life.

To reduce the heat generation by the compressor impeller, air may be bled from the compressor impeller, specifically at the impeller tip. The bleed air may minimize the windage generated near the compressor impeller tip on the aft side of the impeller disk, yet, due to pressure losses, the bleed air from the compressor impeller may not be useful. Therefore, the bleed air may be subsequently discarded, sacrificing both the temperature and pressure of that bleed air.

As such, the present disclosure teaches an arrangement that reduces the heat generation by the compressor impeller 22, while allowing for the bleed air to be reused in other components of the gas turbine engine 10. By reusing the bleed air, the operational efficiency of the gas turbine engine 10 may be increased while maintaining improved impeller operation and life.

To reuse the bleed air from the compressor impeller 22, the gas turbine engine 10 further includes a manifold 20 as shown in FIGS. 2 and 3. The manifold 20 is mounted to the impeller backing plate 26 of the compressor 14 to define a number of circumferentially spaced apart channels 42. The channels 42 receive a bleed flow of compressed gases (represented by arrows 21) moving through a number of bleed holes 44 formed in the backing plate 26.

The bleed holes 44 are arranged radially inwardly from an outlet tip 40 of the impeller blades 30 so as to allow the compressed gases discharged from the outlet tip 40 of the impeller blades 30 to move over the outlet tip 40 and radially along a portion of the impeller disk 32 on the aft side 36 before moving through the impeller backing plate 26 as shown in FIGS. 2 and 3. By bringing some of the compressed gases radially inward along the aft side 36 of the impeller disk 32, the windage heat generation due to rotation of the impeller disk 32 near the outlet tip 40 may be reduced.

In the illustrative embodiment, the bleed holes 44 are positioned at a preselected radial location R1 as shown in FIG. 3. The preselected radial location R1 of the bleed holes 44 is configured to bleed an amount of compressed gases from the outlet tip 40 of the impeller blades 30 that decreases windage heat generation near the outlet tip 40 of the impeller blades 30 on the aft side 36 of the disk 32, but also maintains a high pressure capable of being reused in other components of the engine 10. The channels 42 then carry the compressed gases from the centrifugal compressor 14 to the turbine 18 bypassing the combustor 16.

The arrangement of the bleed holes 44 therefore provides a balance between reducing windage heat generated, while also providing a flow of compressed gases with a high enough pressure so as to be reused in other components of the engine 10. The channels 42 formed by the manifold 20 transport the high pressure compressed gases to the turbine 18 bled from the compressor so that the high pressure compressed gases may be reused in the turbine 18.

In other embodiments, the compressed gases bled from the outlet tip 40 may be transported to another component of the engine 10, such as turbine vanes 50 in the turbine 18. The compressed gases may be transported outside of the engine casing 51 bypassing the combustor 16 to the turbine 18. The compressed gases may be used to cool the turbine vanes 50 before being discharged into the core flow path 19.

In the illustrative embodiment, at least one bleed hole 44 is configured to provide compressed gases to at least one channel 42 formed by the manifold 20. In other embodiments, at least two bleeds holes 44 may be configured to provide compressed gases to at least one channel 42 formed by the manifold 20.

Turning again to the turbine 18, the turbine 18 includes a plurality of bladed rotating wheel assemblies 48 and a plurality of static turbine vane rings 50 that are fixed relative to the axis 11 as suggested in FIGS. 1-4. The hot gases are conducted through the core gas path 19 and interact with the bladed wheel assemblies 48 to cause the bladed wheel assemblies 48 to rotate about the axis 11. Each turbine vane ring 50 includes a plurality of turbine vanes. The turbine vanes 50 are positioned to direct the gases toward the bladed wheel assemblies 48 with a desired orientation.

Each rotating wheel assembly includes a rotor 52, at least one set of turbine blades 54, and a seal 56 as shown in FIGS. 1-4. The rotor 52 has a shaft 58 mounted for rotation about the axis 11. The set of turbine blades 54 is coupled to the shaft 56 for rotation therewith. The seal 58 is formed from forward and aft sealing elements 60, 62 that engage the impeller backing plate 26 of the centrifugal compressor 14 to fluidly separate the back cavity 38 of the compressor 14 from the turbine 18.

The forward sealing element 60 and the aft sealing element 62 of the turbine 18 form a seal cavity 64 therebetween. The seal cavity 64 is in fluid communication with the combustor 16 to receive compressor discharge air from the compressor 14. In the illustrative embodiment, the forward and aft sealing elements 60, 62 are positioned at the same radial location relative to the shaft 58 of the turbine 18.

The impeller backing plate 26 is also formed to include a plurality of impingement holes 46 as shown in FIGS. 2-4. The impingement holes 46 extend radially through the impeller backing plate 26 and open into the seal cavity 64 to transmit compressor discharge air from the compressor 14 to the seal cavity 64.

In the illustrative embodiment, the impingement holes 46 are circumferentially located between the number of circumferentially spaced apart channels 42 formed by the manifold 20. The compressor discharge air pressurizes the seal cavity 64 so that compressor discharge air leaks across the forward sealing element 60 and the aft sealing element 62.

In the illustrative embodiment, the forward sealing element 60 of the seal 56 is configured to leak compressor discharge air to the back cavity 38 as shown in FIG. 4. The air leaked to the back cavity 38 pressurizes the back cavity 38. The air leaked to the back cavity 38 has a high pressure which allows the gases to flow radially outward.

The aft sealing element 62 of the seal 56 is configured to leak compressor discharge air to a wheel cavity 66 as shown in FIG. 4. The air leaked across the aft sealing element 62 returns into the core flow path 19 at a location between a first stage vane 50 and a first stage bladed wheel assembly 48 of the turbine 18. Accordingly, the compressed gases purge and cool the wheel cavity 66 before (re)introduction into the core flow path 19.

In the illustrative embodiment, the channel 42 opens into the wheel cavity 66 as shown in FIG. 3. The bleed flow of compressed gases 21 is configured to purge the cavity 66 and prevent hot gas ingestions from the flow path 19. The bleed flow of compressed gases 21 is mixed with the leaked compressor discharge air from the aft sealing element 62 in the cavity 66.

In the illustrative embodiment, the impeller backing plate 26 includes a radially extending portion 70, an axially extending portion 72, and a sealing portion 74 as shown in FIGS. 3 and 4. The radially extending portion 70 extends radially along the aft side 36 of the impeller disk 32 and is spaced apart from the disk 32 to define a portion of the back cavity 38 therebetween. The axially extending portion 72 extends axially from the radially extending portion and is mounted relative to the turbine 18 to define a portion of the back cavity 38 between the impeller backing plate 26 and the disk 32. The sealing portion 74 extends radially inward from the axially extending portion 72 to engage the forward and aft sealing elements 60, 62 of the turbine 18. In the illustrative embodiment, the forward and aft sealing elements 60, 62 are knife seals that engage abradable bands 76 coupled to the sealing portion 74 of the backing plate 26 as shown in FIGS. 3 and 4.

Figure 5:
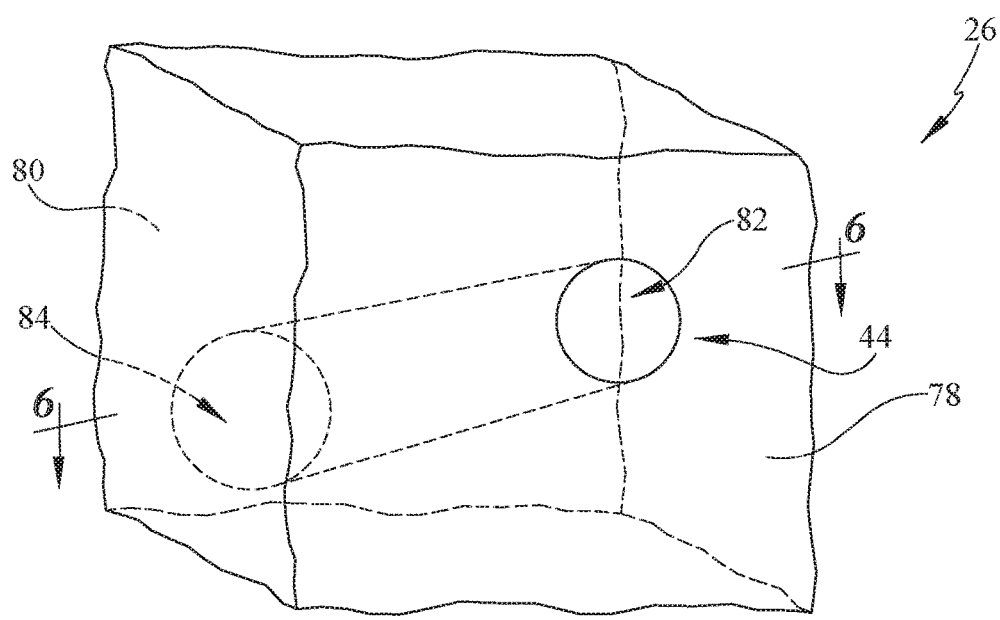
FIG. 5 is a detail view of one bleed hole included in the number of bleed holes of FIG. 3 showing each of the bleed holes has a conical shape that extends through the impeller backing plate so that an inlet opening opens on a forward surface of the impeller backing plate and an outlet opening opens on an aft surface of the impeller backing plate.
Figure 6:
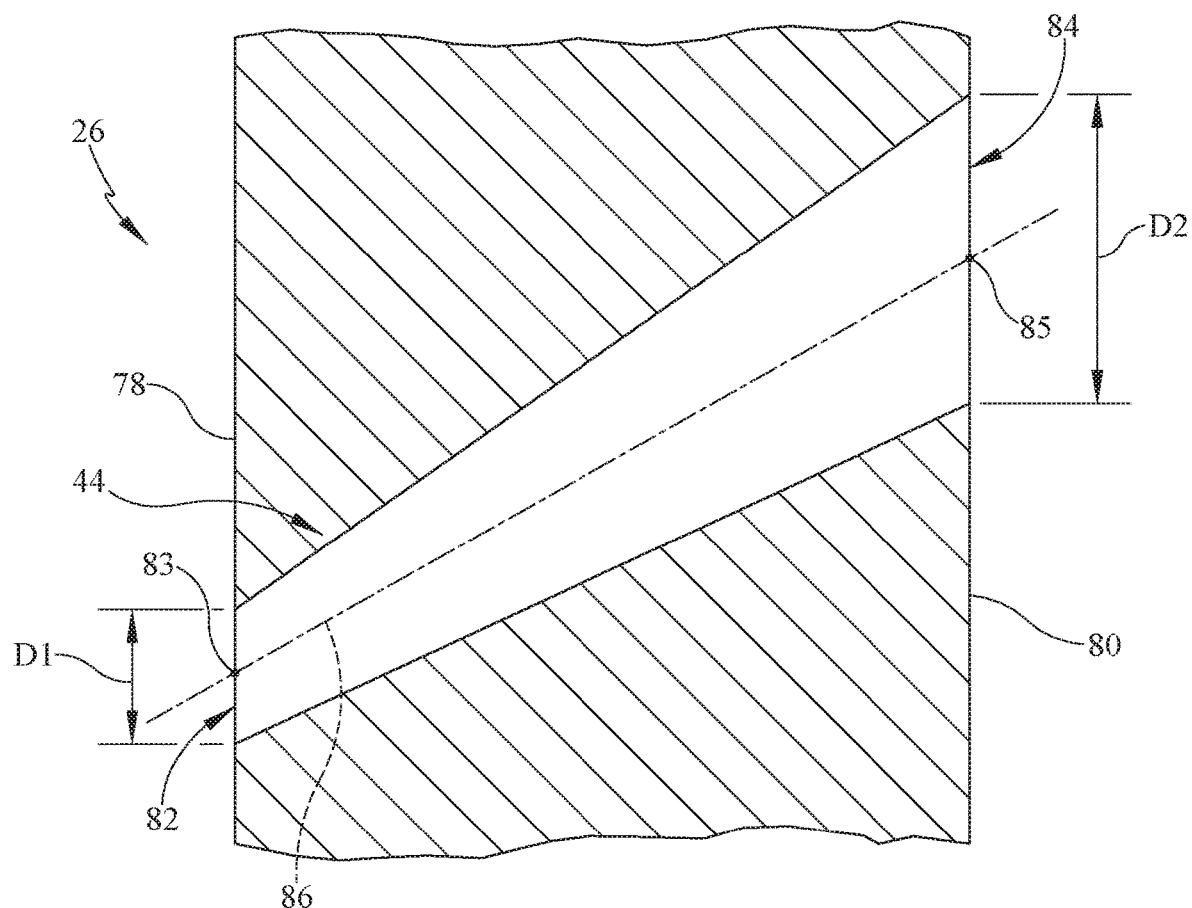
FIG. 6 is a cross section view of FIG. 5 taken along line 6-6 showing the outlet opening of the bleed hole is radially and circumferentially offset from the inlet opening of the bleed hole relative to the axis of the engine.

In the illustrative embodiment, the bleed holes 44 extend through the radially extending portion 70 of the impeller backing plate 26 from a forward surface 78 of the impeller backing plate 26 to an aft surface 80 of the impeller backing plate 26 as shown in FIGS. 5 and 6. Each hole 44 has an inlet opening 82 that opens on the forward surface 78 of the impeller backing plate 26 and an outlet opening 84 that opens on the aft surface 80 of the impeller backing plate 26.

In the illustrative embodiment, the bleed holes 44 are conical in shape as shown in FIGS. 5 and 6. The inlet opening 82 is sized to have a first diameter D1, while the outlet opening 84 is sized to have a second diameter D2 that is larger than the first diameter D1 of the inlet opening 82. The shape of the holes 44 increases/optimizes offtake static pressure.

In the illustrative embodiment, the openings 82, 84 have a circular shape in the illustrative embodiment, but may have an ovular shape in some embodiments. In other embodiments, the openings 82, 84 of the holes 44 may be another suitable shape.

Each of the holes 44 extend axially through the backing plate 26 between the openings 82, 84 along a hole axis 86 as shown in FIG. 6. A center 83 of the inlet opening 82 and a center 85 of the outlet opening 84 are located on the hole axis 86. In the illustrative embodiment, the center 85 of of the outlet opening 84 is radially and circumferentially offset from the center 83 of the inlet opening 82 relative to the axis 11 of the engine 10.

The present disclosure related to centrifugal compressors for use in gas turbine engines 10. One of the limiting mechanical factor of centrifugal compressors may be the metal temperature of the exducer blade tips 40. The metal temperature may be dependent on the how the back cavity 38 manages heat generation from windage. In some embodiments, air may be bled off the impeller 22 and allowed to flow radially inward along the aft surface 80 of the backing plate 26 before it is thrown overboard. This reduces windage near the outlet tip 40 along the aft side 36 of the impeller disk 32, but due to pressure losses, the air is not useful and thus thrown overboard. Conversely, if no air is bled off the outlet tip 40, the air in the back cavity 38 flows radially outward, increasing or maintaining high windage at or near the outlet tip 40, but providing high pressure, which could be useful in the turbine 18 for a number of applications.

In the illustrative embodiment, the windage heat generation is due to the rotation of the aft side 36 of the impeller disk 32 near the outlet tip 40. By arranging the bleed holes 44 radially inward from the outlet tip 40, the bleed flow moves along the aft side 36 near the outlet tip 40 where the windage heat is generated. In this way, the bleed flow reduces the windage heat generation at the aft side 36 of the impeller disk 32 near or radially inward of the outlet tip 40.

The present disclosure teaches an impeller 22 with a backing plate 26 with a plurality of bleed holes 44 and a manifold 20 coupled to the backing plate 26 that formed channels 42 to transmit the compressed gases bled off the outlet tip 40 to the turbine 18. The radial position R1 of the bleed holes 44 is tuned so that windage heat generated between the aft side 36 of the impeller disk 32 and the impeller backing plate 26 near the outlet tip 40 of the impeller 22 may be reduced while the compressed gases from the outlet tip 40 maintain a high enough pressure to be useful in the turbine 18.

The plurality of bleed holes 44 are compound in nature as shown in FIGS. 5 and 6. The holes 44 have a tangential angle relative to the backing plate 32. In the illustrative embodiments, the tangential angle may be about 65 degrees. The shape of the holes 44 maximizes the static offtake pressure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine engine comprising
a centrifugal compressor including (i) an impeller mounted for rotation about an axis and formed to have impeller blades that extend from a forward side of an impeller disk and (ii) an impeller backing plate arranged along an aft side of the impeller disk to define a back cavity of the centrifugal compressor therebetween, the impeller backing plate is formed to include a number of bleed holes arranged radially inwardly from an outlet tip of the impeller blades so as to allow for a first portion of compressed gases discharged from the outlet tip of the impeller blades to move over the outlet tip and radially along a portion of the impeller disk on the aft side of the impeller disk before moving through the number of bleed holes in the impeller backing plate,
a combustor fluidly coupled to the centrifugal compressor to receive a second portion that is a majority of the compressed gases discharged from the outlet tip of the impeller blades as a compressor discharge air, the combustor configured to mix fuel with a first portion of the compressor discharge air and to ignite the fuel so as to create hot, high pressure combustion products,
a turbine fluidly coupled to the combustor to receive the hot, high pressure combustion products from the combustor and configured to extract mechanical work from the hot, high pressure combustion products, the turbine including a rotor having a shaft mounted for rotation about the axis, at least one set of turbine blades coupled to the shaft for rotation therewith, and a seal formed from a forward sealing element and an aft sealing element that each engage the impeller backing plate of the centrifugal compressor to fluidly separate the back cavity of the centrifugal compressor from the turbine, wherein a seal cavity is formed between the forward sealing element and the aft sealing element of the seal and the seal cavity is in fluid communication with the centrifugal compressor to receive a second portion of the compressor discharge air, and a manifold mounted to the impeller backing plate that is shaped to define a number of circumferentially spaced apart channels that receive the first portion of the compressed gases moving through the number of bleed holes and to carry the first portion of the compressed gases from the centrifugal compressor to the turbine and bypassing the combustor, wherein the impeller backing plate is formed to include a plurality of impingement holes that extend radially through the impeller backing plate and open into the seal cavity to transmit the second portion of the compressor discharge air from the centrifugal compressor to the seal cavity.

2. The turbine engine of claim 1, wherein the seal cavity is pressurized by the second portion of the compressor discharge air.

3. The turbine engine of claim 2, wherein the forward sealing element of the seal included in the turbine is configured to leak at least some of the second portion of the compressor discharge air to the back cavity formed between the impeller disk of the centrifugal compressor and the impeller backing plate.

4. The turbine engine of claim 1, wherein the plurality of impingement holes that transmit the second portion of the compressor discharge air from the centrifugal compressor to the seal cavity are circumferentially located between the number of circumferentially spaced apart channels formed by the manifold.

5. The turbine engine of claim 2, wherein the aft sealing element of the seal included in the turbine is configured to leak at least some of the second portion of the compressor discharge air to the turbine.

6. The turbine engine of claim 2, wherein the forward sealing element and the aft sealing element are positioned at the same radial location relative to the axis of the turbine engine.

7. The turbine engine of claim 1, wherein at least one bleed hole of the number of bleed holes is configured to provide the first portion of the compressed gases to at least one channel of the number of circumferentially spaced apart channels formed by the manifold.

8. The turbine engine of claim 7, wherein the at least one bleed hole comprises at least two bleeds holes that are configured to provide the first portion of the compressed gases to the at least one channel of the number of circumferentially spaced apart channels formed by the manifold.

9. The turbine engine of claim 1, wherein the number of bleed holes are positioned at a preselected radial location relative to the axis so as to bleed the first portion of the compressed gases from the outlet tip of the impeller blades in an amount that decreases windage near the outlet tip of the impeller blades.

10. A gas turbine engine comprising a centrifugal compressor including an impeller mounted for rotation about an axis with impeller blades that extend from a forward side of an impeller disk and an impeller backing plate arranged along an aft side of the impeller disk to define a back cavity of the centrifugal compressor therebetween, the impeller backing plate formed to include a number of bleed holes arranged radially inwardly from an outlet tip of the impeller blades so as to allow for a first portion of compressed gases discharged from the outlet tip of the impeller blades to move through the back cavity as compressed bleed gases before moving through the number of bleed holes in the impeller backing plate, a turbine including a rotor having a shaft mounted for rotation about the axis and a seal formed from a forward sealing element and an aft sealing element that each engage the impeller backing plate of the centrifugal compressor to fluidly separate the back cavity of the centrifugal compressor from the turbine, a manifold mounted to the impeller backing plate that is shaped to define a number of circumferentially spaced apart channels that receive the compressed bleed gases moving through the number of bleed holes and to carry the compressed bleed gases from the centrifugal compressor to the turbine and bypassing other components of the gas turbine engine, wherein the impeller backing plate is formed to include a plurality of impingement holes that extend radially through the impeller backing plate and open into a seal cavity formed between the forward sealing element and the aft sealing element of the seal to transmit a second portion of the compressed gases as a first portion of a compressor discharge air from the centrifugal compressor to the seal cavity.

11. The gas turbine engine of claim 10, wherein the other components of the gas turbine engine includes a combustor fluidly coupled to the centrifugal compressor to receive a third portion that is a majority of the compressed gases from the centrifugal compressor as a second portion of the compressor discharge air and the combustor is fluidly coupled to the turbine to discharge hot, high pressure combustion products to the turbine.

12. The gas turbine engine of claim 11, wherein the seal cavity is pressurized by the first portion of the compressor discharge air.

13. The gas turbine engine of claim 12, wherein the forward sealing element of the seal is configured to leak at least some of the first portion of the compressor discharge air to the back cavity formed between the impeller disk of the centrifugal compressor and the impeller backing plate.

14. The gas turbine engine of claim 12, wherein the aft sealing element of the seal included in the turbine is configured to leak at least some of the first portion of the compressor discharge air to the turbine.

15. The gas turbine engine of claim 14, wherein the plurality of impingement holes are circumferentially spaced apart between the number of circumferentially spaced apart channels formed by the manifold.

16. The gas turbine engine of claim 10, wherein the forward sealing element and the aft sealing element are positioned at the same radial location relative to the axis of the gas turbine engine.

17. The gas turbine engine of claim 10, wherein at least one bleed hole of the number of bleed holes is configured to provide the compressed bleed gases to at least one channel of the number of circumferentially spaced apart channels formed by the manifold.

18. The gas turbine engine of claim 17, wherein the at least one bleed hole comprises at least two bleeds holes that are configured to provide the compressed bleed gases to the at least one channel of the number of circumferentially spaced apart channels formed by the manifold.

19. A turbine engine comprising
a centrifugal compressor including (i) an impeller mounted for rotation about an axis and formed to have impeller blades that extend from a forward side of an impeller disk and (ii) an impeller backing plate arranged along an aft side of the impeller disk to define a back cavity of the centrifugal compressor therebetween, the impeller backing plate is formed to include a number of bleed holes arranged radially inwardly from an outlet tip of the impeller blades so as to allow for a first portion of compressed gases discharged from the outlet tip of the impeller blades to move over the outlet tip and radially along a portion of the impeller disk on the aft side of the impeller disk before moving through the impeller backing plate,
a combustor fluidly coupled to the centrifugal compressor to receive a second portion that is a majority of the compressed gases discharged from the outlet tip of the impeller blades as compressor discharge air, the combustor configured to mix fuel with a first portion of the compressor discharge air and to ignite the fuel so as to create hot, high pressure combustion products,
a turbine fluidly coupled to the combustor to receive the hot, high pressure combustion products from the combustor and configured to extract mechanical work from the hot, high pressure combustion products, the turbine including a rotor having a shaft mounted for rotation about the axis, at least one set of turbine blades coupled to the shaft for rotation therewith, and a seal formed from a forward sealing element and an aft sealing element that each engage the impeller backing plate of the centrifugal compressor to fluidly separate the back cavity of the centrifugal compressor from the turbine,
wherein a seal cavity is formed between the forward sealing element and the aft sealing element of the seal and the seal cavity is in fluid communication with the centrifugal compressor to receive a second portion of the compressor discharge air, and
a manifold mounted to the impeller backing plate that is shaped to define a number of circumferentially spaced apart channels that receive the first portion of the compressed gases moving through the number of bleed holes and to carry the first portion of the compressed gases from the centrifugal compressor to the turbine and bypassing the combustor,
wherein the aft sealing element of the seal included in the turbine is configured to leak at least some of the second portion of the compressor discharge air to the turbine.

20. The turbine engine of claim 19, wherein the forward sealing element of the seal included in the turbine is configured to leak at least some of the second portion of the compressor discharge air to the back cavity formed between the impeller disk of the centrifugal compressor and the impeller backing plate.

21. The turbine engine of claim 20, wherein the forward sealing element and the aft sealing element are positioned at the same radial location relative to the axis of the turbine engine.

22. The turbine engine of claim 19, wherein at least one bleed hole of the number of bleed holes is configured to provide the first portion of the compressed gases to at least one channel of the number of circumferentially spaced apart channels formed by the manifold.

23. The turbine engine of claim 22, wherein the at least one bleed hole comprises at least two bleeds holes that are configured to provide the first portion of the compressed gases to the at least one channel of the number of circumferentially spaced apart channels formed by the manifold.

24. The turbine engine of claim 19, wherein the number of bleed holes are positioned at a preselected radial location relative to the axis so as to bleed the first portion of the compressed gases from the outlet tip of the impeller blades in an amount that decreases windage near the outlet tip of the impeller blades.

25. A gas turbine engine comprising
a centrifugal compressor including an impeller mounted for rotation about an axis with impeller blades that extend from a forward side of an impeller disk and an impeller backing plate arranged along an aft side of the impeller disk to define a back cavity of the centrifugal compressor therebetween, the impeller backing plate formed to include a number of bleed holes arranged radially inwardly from an outlet tip of the impeller blades so as to allow for a first portion of compressed gases discharged from the outlet tip of the impeller blades to move through the back cavity as compressed bleed gases before moving through the number of bleed holes in the impeller backing plate,
a turbine including a rotor having a shaft mounted for rotation about the axis and a seal formed from a forward sealing element and an aft sealing element that each engage the impeller backing plate of the centrifugal compressor to fluidly separate the back cavity of the centrifugal compressor from the turbine,
a manifold mounted to the impeller backing plate that is shaped to define a number of circumferentially spaced apart channels that receive the compressed bleed gases moving through the number of bleed holes and to carry the compressed bleed gases from the centrifugal compressor to the turbine and bypassing other components of the gas turbine engine,
wherein the aft sealing element of the seal included in the turbine is configured to leak at least some of a second portion of the compressed gases that is a first portion of a compressor discharge air to the turbine.

26. The gas turbine engine of claim 25, wherein the forward sealing element of the seal is configured to leak at least some of the first portion of the compressor discharge air to the back cavity formed between the impeller disk of the centrifugal compressor and the impeller backing plate.

27. The gas turbine engine of claim 25, wherein a plurality of impingement holes that extend radially through the impeller backing plate and open into a seal cavity formed between the forward sealing element and the aft sealing element to transmit the second portion of the compressed gases as the first portion of the compressor discharge air from the centrifugal compressor to the seal cavity, are circumferentially spaced apart between the number of circumferentially spaced apart channels formed by the manifold.

28. The gas turbine engine of claim 25, wherein the forward sealing element and the aft sealing element are positioned at the same radial location relative to the axis of the gas turbine engine.

29. The gas turbine engine of claim 25, wherein at least one bleed hole of the number of bleed holes is configured to provide the compressed bleed gases to at least one channel of the number of circumferentially spaced apart channels formed by the manifold.

30. The gas turbine engine of claim 29, wherein the at least one bleed hole comprises at least two bleeds holes that are configured to provide the compressed bleed gases to the at least one channel of the number of circumferentially spaced apart channels formed by the manifold.

\* \* \* \* \*